United States Patent [19]

Fassler et al.

[11] Patent Number: 4,635,313
[45] Date of Patent: Jan. 13, 1987

[54] BRUSH WITH SELF RETAINING BRISTLES

[75] Inventors: Friedbert Fassler, Oswego; Frank Kigyos, Sugargrove; Bobby L. Slaughter, Naperville, all of Ill.

[73] Assignee: North American Philips Corporation, New York, N.Y.

[21] Appl. No.: 792,621

[22] Filed: Oct. 24, 1985

Related U.S. Application Data

[63] Continuation of Ser. No. 552,533, Nov. 16, 1983, abandoned.

[51] Int. Cl.[4] .......................... A46B 3/04; A46D 3/00
[52] U.S. Cl. ..................................... 15/193; 264/243; 300/321
[58] Field of Search .................. 15/191 R, 191 A, 192, 15/193, 194, 195, 196, 197, 198, 199; 300/21; 264/243

[56] References Cited

U.S. PATENT DOCUMENTS

| 576,866 | 2/1897 | Look | 15/193 |
| 2,298,156 | 10/1942 | Person | 15/193 X |
| 2,672,640 | 3/1954 | Peterson et al. | 15/193 X |
| 2,862,776 | 3/1958 | Peterson | 15/DIG. 3 |
| 3,604,043 | 9/1971 | Lewis, Jr. | 15/192 |
| 3,857,134 | 12/1974 | Wells | 15/195 |
| 4,211,217 | 7/1980 | Gueret | 15/196 X |

FOREIGN PATENT DOCUMENTS

| 191657 | 10/1907 | Fed. Rep. of Germany | 15/193 |
| 2909638 | 9/1980 | Fed. Rep. of Germany | 15/191 R |

Primary Examiner—Peter Feldman
Attorney, Agent, or Firm—Robert J. Kraus

[57] ABSTRACT

A process for manufacturing a brush having an integral bristle retention feature. One end of each bristle tuft to be inserted into a molded brush body is fused into a ball-shaped mass. The body is molded around the mass, thereby anchoring the tufts in the body.

4 Claims, 16 Drawing Figures

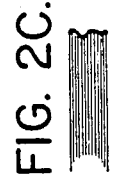
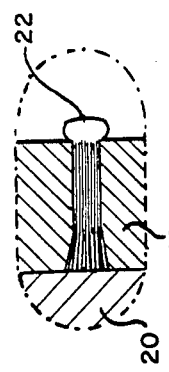
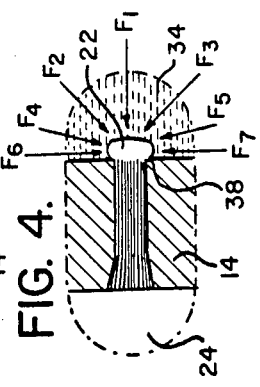
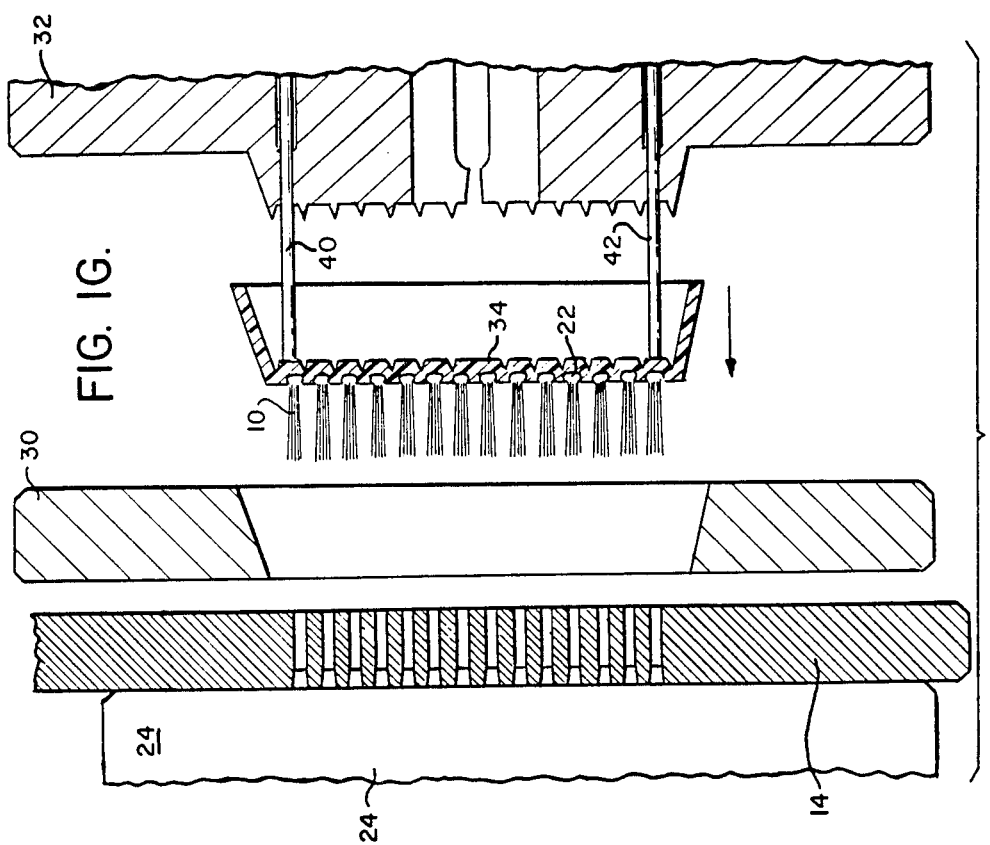

BRUSH WITH SELF RETAINING BRISTLES

This is a continuation of application Ser. No. 552,533, filed Nov. 16, 1983, now abandoned.

BACKGROUND OF THE INVENTION

1. Field of the Invention

This invention relates to brush making and in particular to a method for manufacturing a brush having bristles securely anchored in a molded body, and to a brush thus manufactured.

2. Description of the Prior Art

It is common practice in the art of brush making to first mold a brush body with a pattern of bristle-receiving holes and to then secure bristle tufts in the holes by means of wire staples which are rammed into the holes along with looped ends of respective tufts. Although this process produces acceptable brushes, brush makers have long sought to develop a simple process whereby the body is molded directly around the ends of the bristles to secure them in place, thereby eliminating the need for staples.

Stapleless brush making processes have been known since at least 1870, when U.S. Pat. No. 105,373 issued. This patent discloses a brush making process in which a molding material is introduced into the cavity of a mold having perforations in one side through which bristle tufts have been inserted such that looped ends of the tufts project into the cavity. This side of the mold is made of parallel strips which can be separated along the perforations after the molding material forming the brush body has hardened, to facilitate removal of the bristles from the mold side without loosening or extracting the bristles from the body. The use of separable strips is an indication of the inability of the molded back to securely hold the bristles. Such a separable side is also incompatible with the high pressure injection molding techniques used today for high speed brush production, because the areas between facing surfaces of the strips would provide leakage paths for the injected molding material.

Processes for injection molding brush bodies directly around the ends of bristles are disclosed in U.S. Pat. Nos. 2,298,156, 2,317,110 and 3,026,146. In each of these processes a perforated side of the mold, through which bristle tuft ends are inserted into the mold cavity, is formed from a unitary plate. This type of plate eliminates the major leakage paths which exist in a separable plate, but does not eliminate leakage through the perforations around the tufts. Further, to improve bristle retention each of these patents discloses the use of a perforated bristle supporting insert which is positioned inside the mold cavity such that its perforations align with the bristle insertion perforations in the side of the mold. The ends of the bristle tufts are then inserted into the cavity through the aligned perforations and the molding material is injected around the insert, which becomes an integral part of the brush body. While such inserts might improve bristle retention, they cannot be used in the manufacture of small thin brushes. The use of inserts also increases the cost of materials needed to produce brushes, complicates the manufacturing process, and increases the probability of producing defective brushes. The inserts must be specially made, means must be provided to position them in the mold cavity and to align their perforations with those in the perforated mold side, and any deformed or misaligned inserts which prevent proper bristle insertion will cause the respective brushes to be rejected.

Injection molding processes utilizing clamping means for preventing leakage of molding material through bristle insertion perforations are disclosed in U.S. Pat. Nos. 2,643,158 and 3,610,692. In each of these patents, clamping means are forced against the sides of the bristle tufts, where they protrude from the mold perforations, to prevent molding material from leaking through the perforations. Such clamping means add complexity to the mold apparatus, and the applied clamping force must be accurately controlled to prevent permanent deformation or severance of the bristles. U.S. Pat. No. 2,643,158 also discloses a process including fusion of the ends of the bristles in each tuft projecting into the mold cavity to secure the bristles together. To ensure that heat applied to fuse the ends of the bristles does not deteriorate any substantial length of the bristles, heating is effected by bringing an iron into contact with only the very ends of the bristles. Although fusion of the ends of the bristles in this manner might secure individual bristles within a tuft, it does little to improve retention of the tufts themselves.

SUMMARY OF THE INVENTION

It is an object of the invention to provide a brush making process which securely anchors the bristles in an injection molded body without using staples, inserts or any other supplementary bristle retaining members.

It is another object of the invention to provide such a process which enables the use of a simple mold and which does not require special clamping means to prevent leakage of injected molding material.

It is yet another object of the invention to provide a brush having a configuration which effects self retention of the bristles.

These and other objects are achieved by a series of process steps for producing a type of bristle tuft and brush body which are configured such that they cooperate to effect self-retention of the tuft in the body. In accordance with the invention, at least one bristle tuft is inserted into a respective hole in a first mold member such that a length of the tuft protrudes from a side of the member which will subsequently form an inner surface of a mold cavity for the brush body. At least a portion of the protruding length of tuft is then fused into a mass having a larger cross-section than that of the hole at the inner side of the mold member. The first mold member is then mated with a second mold member to define the mold cavity for the brush body, and molding material is injected into the cavity. The molding material presses against the fused mass, plugging the hole, and also flows between at least the widest portion of the mass and the inner surface of the first mold member as the material fills the cavity and takes the form of the brush body. The material flowing between the fused mass and the first mold member forms an integral tuft retaining portion of the brush body which partially surrounds and securely anchors the fused mass, and thus the tuft, in the body.

The word fusion, as used in this specification, is defined as the transformation of a substance to a plastic state by heat or other means, including chemical means. Accordingly, fusion of the end of a tuft may be effected by a wide variety of techniques including heat transfer from hot fluid flowing across the end, radiant heat application, exothermic chemical reaction, ultrasonic vibration, and application of a solvent. In a preferred embodiment, fusion is accomplished by electrically heating an inert gas and blowing the heated gas across the end of the tuft.

By use of the invention the brush making process is simplified and yet produces a new type of brush featuring self-retention of the bristles. Injection molding and bristle retention are effectively combined into one operation while eliminating the need for supplementary means for anchoring the bristles in place.

BRIEF DESCRIPTION OF THE DRAWING

Exemplary embodiments of the invention will now be described with reference to the drawing in which:

FIGS. 1A-1G illustrate a series of process steps for manufacturing a brush in accordance with the invention;

FIGS. 2A-2C illustrate some different tuft end shapes which can be formed during bristle insertion;

FIG. 3 is an enlarged view of a portion of FIG. 1C, showing a single tuft after a fusion step has been performed;

FIG. 4 is an enlarged view of a portion of FIG. 1D, showing the same tuft after an injection step has been performed;

DESCRIPTION OF THE PREFERRED EMBODIMENTS

Figure 1D:
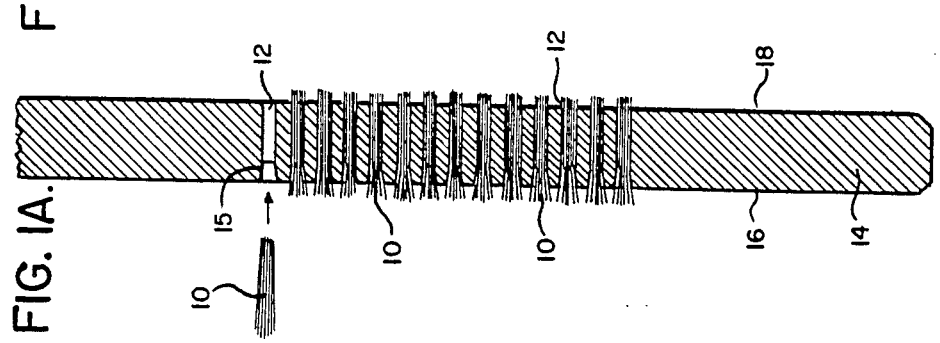
Figure 1C:
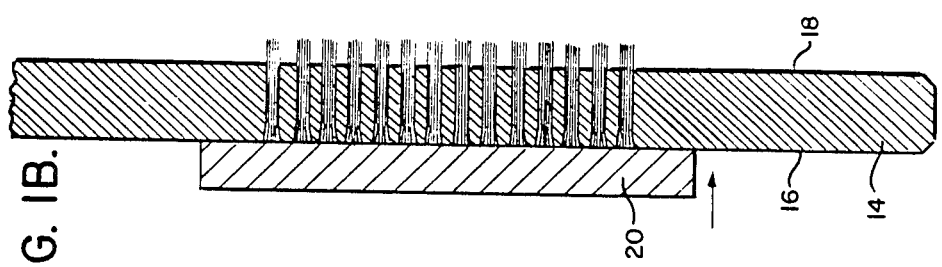
Figure 1B:
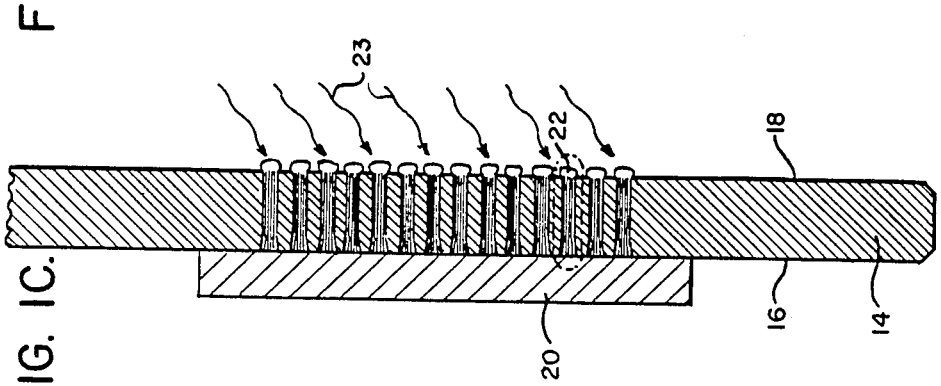
Figure 1A:
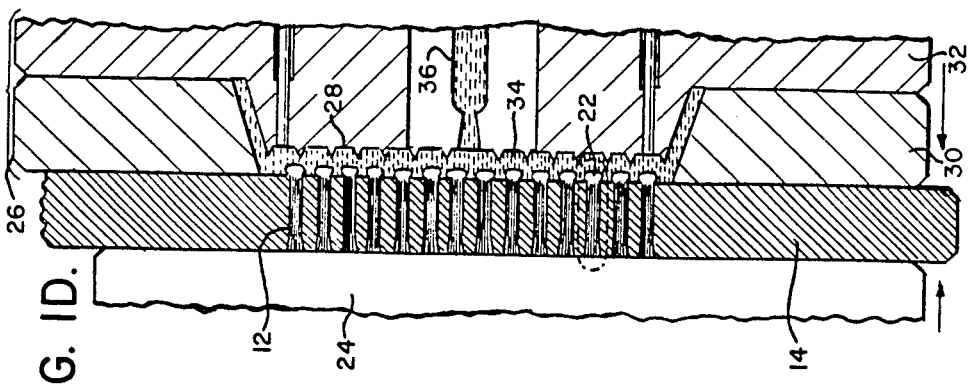

FIG. 1A depicts the insertion of bristle tufts 10 into a pattern of bristle receiving holes 12 formed through an index plate 14 which is shown in section to expose the interiors of some of the holes. The index plate 14 is preferably disc-shaped and is mounted to rotate around a central axis (not shown) such that the pattern of bristle receiving holes can be easily indexed from one station to the next during the steps of the brush making process. Each of the holes formed through the plate has a widened portion 15 near a front side 16 of the plate to facilitate insertion of the bristle tufts. During the step depicted in FIG. 1A, a bristle insertion machine located at a first station inserts the tufts into the holes. The tufts can be either precut and fed to the machine, or the machine itself can cut tufts from a bundle of continuous strands of bristle material. If precut tufts are used, they can be either looped at the end to be inserted or cut on both ends, as shown. The thickness of the index plate is approximately equal to the desired length of the tufts in the finished brush. The tufts 10 should be sufficiently long so that approximately 3 to 5 millimeters protrudes from the back side 18 of the plate after the tufts are pushed into their final positions in the holes.

Final positioning is illustrated in FIG. 1B where a backing plate 20 has been pushed against exposed ends of the tufts until they are flush with the front side 16 of the index plate 14. The bristle contacting surface of the backing plate can be planar as shown, thus forming the end of each tuft into a flat shape, or it can be configured to form the ends of the tufts into other shapes more suitable to a particular use for which the brush being manufactured is intended. Some useful tuft end shapes include the convex, conical and concave shapes shown in FIGS. 2A, 2B, and 2C, respectively.

After the tufts have been positioned and shaped by the backing plate 20, heat is applied to fuse the lengths of the tufts protruding from the back side 18 of the index plate 14. This step is illustrated in FIG. 1C which shows the protruding lengths fused into roughly ball-shaped masses 22 by the applied heat shown schematically by wavy lines 24. An enlarged view of one of the fused masses 22 is presented in FIG. 3, which illustrates the circled portion of FIG. 1C. The type and magnitude of heat energy applied is determined primarily by the type of bristle material used. If a natural color bristle material such as DUPONT NC410 is used, a simple method, such as flame heating, can be employed to fuse the protruding ends of the tufts. This material does not blacken when a flame from a burner utilizing a common gas such as natural gas, propane gas or oxy-acetylene is passed across the tuft ends. It is desireable that the ends of the tufts which are heated do not blacken if a transparent molding material is used to form the brush body, because the blackened ends would be visible through the body. In another method for fusing the tuft ends without blackening, an inert gas such as nitrogen is heated by passing it through an electric heating coil, and the heated gas is then blown across the tuft ends until the individual bristles in each tuft end melt together and deform to the ball-shaped mass shown in FIG. 3. Heated air can also be used, but the temperature of the air and the duration of the heat application to the tuft ends must be more carefully controlled to ensure that they are not heated to their ignition temperature. Other fusion techniques which may be utilized include heat radiation, ultrasonic vibration, and the temporary application of a solvent or a hot solution to the tuft ends. Such a solution could be preheated or could be a chemical bath undergoing an exothermic reaction.

After fusion, the backing plate 20 is withdrawn and the index plate 14 is rotated to an injection molding station as illustrated in FIG. 1D, where a clamp plate 24 and a mold part 26 are pressed against opposite sides of the index plate 14. The clamp plate 24 functions to support the index plate 14 against the relatively high force applied thereto by the mold part 26 to prevent leakage of injected molding material between the juncture of plate 14 and part 26. The complete mold includes both the portion of the index plate containing the bristles, which forms one side of a mold cavity 28, and the mold part 26, which forms the remainder of the cavity. Mold part 26 is itself formed by two separable mold members—a cavity plate 30 and a mold core 32. As is more fully explained below, the part 26 is made separable to facilitate removal of a completed brush.

After the cavity 28 is formed, a plastic molding material 34 is injected into the cavity through a port 36 with sufficient pressure to fill the cavity and take the form of the brush body. It is during this injection step that the fused masses 22 cooperate with the injected material to both prevent leakage through the tuft receiving holes 12 and to form integral tuft retaining means. This cooperation is best illustrated in FIG. 4 which is an enlarged view of the circled portion of FIG. 1D showing an exemplary one of the fused masses 22 surrounded by molding material 34 which is still in its liquid state. The arrows in FIG. 4 represent the forces applied to the fused mass by the pressurized molding material and make clear both how the fused mass plugs the hole 12 against leakage and how the respective integral retaining portion of the brush body is formed.

Forces $F_1$–$F_3$ tend to force the fused mass 22 against the plate 14 which produces equal but opposite counteracting forces (not shown). These counteracting forces are necessarily applied by the plate 14 to the fused mass 22 at their only common contact surface, which is an annular rim 38 around the hole 12 where the fused mass 22 is pressed against the plate 14 by forces $F_1$–$F_3$. Because of the concentration of the counteracting forces at this rim, a tight seal is formed between the fused mass and the plate, thereby preventing leakage. This seal is just as effective at higher injection pressures as it is at lower ones, because an increase in injection pressure causes increased sealing forces to be developed at the annular rim.

The forces $F_4$, $F_6$ and $F_5$, $F_7$, respectively, counteract each other, and primarily serve to make the molding material surround the fused mass 22. The molding material flows around the fused mass and up to the seal 38, forming an integral tuft retaining structure having a C-shaped cross-section as viewed in FIG. 4.

The entire injection molding step, including injection and hardening of the molding material to a degree sufficient to enable removal of the completed brush from the mold, typically takes only about 20 seconds.

Figure 1E:
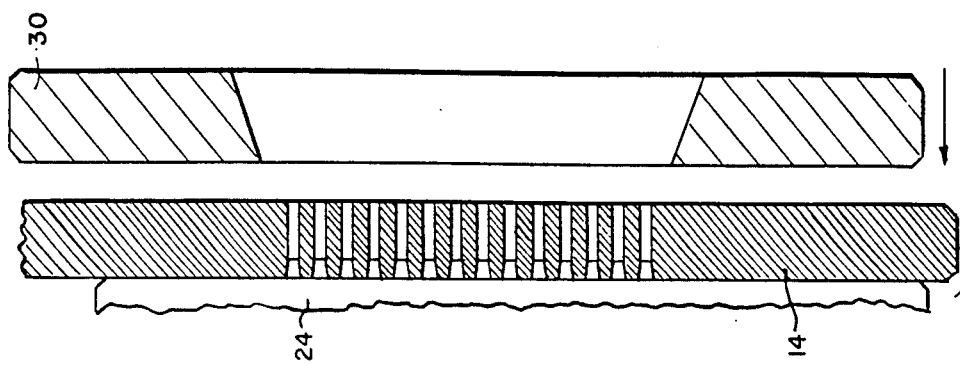

Following hardening, the bristle tufts 10 are removed from the index plate 14 by withdrawing the entire mold part 26 from the index plate, as illustrated in FIG. 1E. The tufts are securely anchored in the hardened plastic material 34 of the brush body by the integral retaining structures formed in the body around the fused masses 22 at the ends of the tufts 10.

Figure 1F:
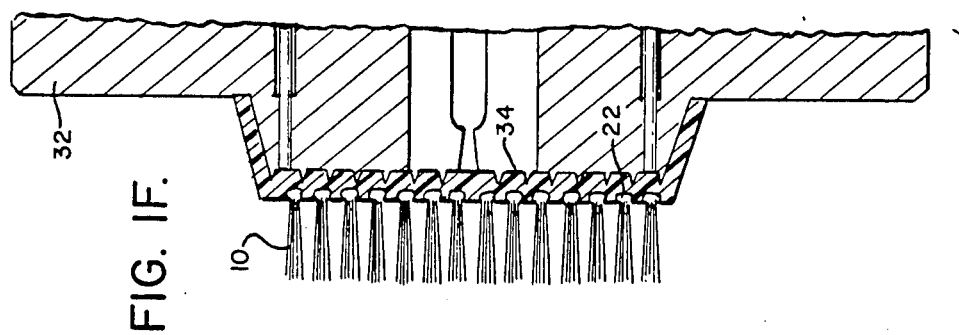

The mold part 26 is then opened, as shown in FIG. 1F, by separating the cavity plate 30 from the mold core 32, enabling ejection of the finished brush from the mold. As is illustrated in FIG. 1G, ejection is accomplished by using knockout pins 40, 42 to push the brush body away from the mold core 32. The finished brush is illustrated in FIG. 5.

Although FIGS. 1F and 1G show the index plate 14 still in position at the injection molding station, this plate can be rotated toward the bristling station illustrated in FIG. 1A at any time after the bristle tufts are removed from the plate, as illustrated in FIG. 1E. This and other modifications can be made to increase the production rate. For example, a plurality of bristle receiving hole patterns can be provided in the index plate, each moving to a different station as the plate is rotated.

Figure 5:
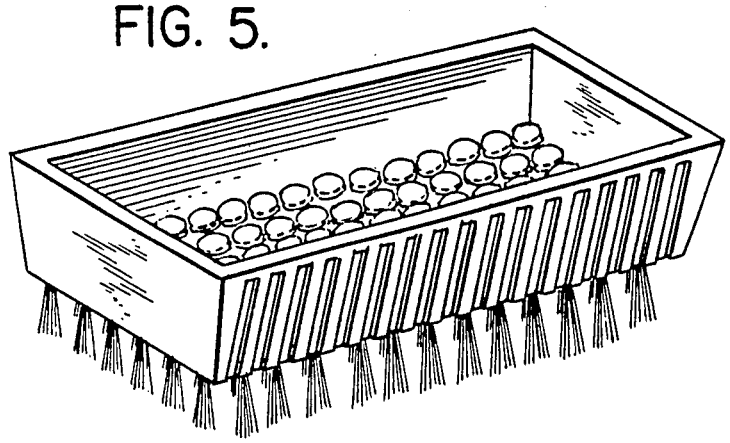
FIG. 5 is an isometric view of the finished brush manufactured by the process steps illustrated in FIGS. 1A-1G.
Figure 6A:
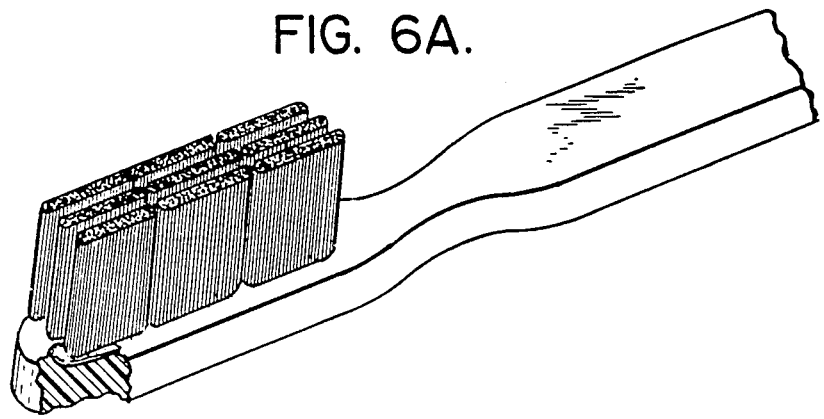
FIGS. 6A-6C illustrate a variety of tuft configurations in accordance with the invention.
Figure 6B:
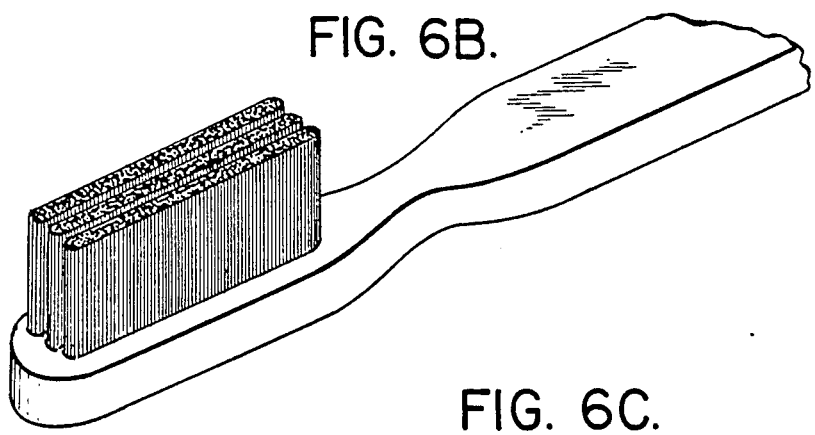
Figure 6C:

From outward appearance, the finished brush illustrated in FIG. 5 looks the same as prior art brushes, unless the places where the bristle tufts enter the brush body are closely examined. Such an examination will show the absence of supplementary bristle retaining means such as the wire staples commonly used in brush making, and it will show an unusually close fit of the body material to the bristle tufts. The unique configuration of brushes in accordance with the invention is more readily apparent in FIGS. 6A, 6B, 6C illustrating a variety of brushes which highlight an additional advantage of the invention. These figures show toothbrushes with bristle tufts having elongated cross-sections. The self retaining feature, clearly visible in the cutaway portion of FIG. 6A, enables unusually large tufts to be insetted, resulting in brushes having more densely packed bristles than are practical in prior art brushes. As illustrated in FIG. 6C, it is even possible to produce a brush in which all of the bristles are formed into a single large tuft, to maximize bristle density.

We claim:

1. A brush comprising an injection molded body and at least one tuft of bristles having an end thereof retained in said body, characterized in that said end comprises a fused mass having a cross-sectional area larger than that of the tuft, said fused mass being disposed immediately adjacent a face of the body from which the tuft projects, thereby facilitating plugging of a tuft-receiving hole in a mold in which the body is formed, said body being molded around said fused mass such that it defines a cavity conforming to the shape of the fused mass and having in said face an opening with a cross-sectional area smaller than that of the fused mass, thereby effecting retention of the tuft end in the body.

2. A brush as in claim 1 where the enlarged fused mass has a circular cross-section.

3. A brush as in claim 1 where the enlarged fused mass has an elongated cross-section.

4. A brush as in claim 1 where all of the bristles of the brush are formed into a single tuft.

* * * * *